United States Patent Office 2,995,529
Patented Aug. 8, 1961

2,995,529
ZINC SILICATE SOLS, THEIR PREPARATION AND USE IN MAKING ELECTRICALLY CONDUCTIVE COMPOSITIONS, FILMS, AND HEATING ELEMENTS
Robert Smith-Johannsen, Niskayuna, N.Y., assignor, by mesne assignments, to Chemelex, Inc., Niskayuna, N.Y., a corporation of New York
No Drawing. Filed Aug. 24, 1955, Ser. No. 530,420
11 Claims. (Cl. 252—506)

This invention relates to new zinc silicate compositions which are useful in the manufacture of electrically conductive compositions, films, and heating elements and to the method of making the same. More particularly, the invention relates to new colloidal zinc silicate sols or compositions formed by reacting a low alkali content silica with finely divided zinc. The invention also includes electrically conductive compositions and heating elements made therefrom and the method of making the same.

According to this invention, the new zinc silicate compositions are formed by mixing a finely divided low alkali content silica with finely divided zinc in an aqueous medium, and effecting a reaction between the silica and zinc. The reaction may be accomplished by various means, however, I have found that it is advantageous to effect the reaction between the components by agitation, such as by tumbling in air at about room temperature. The reaction product is a suspension of colloidal zinc silicate particles.

When the finely divided zinc is mixed with the silica in an aqueous medium and agitated in air until the chemical reaction is complete, a colloidal form of zinc silicate results which has the appearance of dirty water. A large floc type product is also formed during the reaction which settles to the bottom easily permitting the new colloidal zinc silicate to be separated from the floc type product by decantation or filtering.

It is believed that the large floc type particles are a form of zinc silicate formed by the silica coating the zinc particles in ever thickening layers during the reaction resulting in the large particles and flocs of zinc silicate. Since zinc is soluble in alkaline silica, it is also believed that during the coating of the zinc particles by the silica, that the zinc ions in the solution migrate to the colloidal silica particles forming the new colloidal zinc silicate of this invention.

The invention also includes the method of forming the colloidal zinc silicate by slowly adding the zinc dust over an extended period to the alkaline aqueous colloidal silica and agitating the mixture during the zinc addition. An advantage of this method is that the yield of the colloidal form of zinc silicate is greatly increased with a corresponding decrease in the formation of the large floc particles. It is advantageous to add the zinc to the colloidal silica suspension over a period of several hours. If the aqueous silica is slowly added to the zinc over a period of several hours, the large floc type product is predominantly formed with a correspondingly low yield of the novel colloidal zinc silicate.

An alkaline silica which can be used to form the colloidal zinc silicates of this invention is a very fine colloidal silica marketed under the trade name "Ludox" by E. I. du Pont de Nemours. Ludox is a slightly alkaline silica and is marketed as a water slurry containing about 30 percent solids. It is composed of about 29 to 31% $SiO_2$, 0.29 to 0.39% $Na_2O$ and a maximum of 0.15% sulfates as $Na_2SO_4$. The method of producing and the properties of Ludox are described in U.S. Patent No. 2,574,902.

The proportions of zinc and silica can be varied within a fairly wide range if desired; however, I have found it to be advantageous to use stoichiometric proportions of zinc and silica. As stated above, the new colloidal zinc silicate sols or compositions are formed by reacting a low alkali-content silica with finely divided zinc. The amount of alkali present in the dispersion during the reaction of the silica with the zinc can be varied from about as low as that present in the Ludox silica referred to above up to about 1 percent by weight expressed as $Na_2O$ based on the weight of the silica originally present.

Various finely divided zinc products can be used to react with the silica such as zinc dust.

The invention also includes electrically conductive compositions, films and heating elements made from the novel zinc silicate sols and compositions by incorporating therein an electrically conductive material such as finely divided zinc or graphite. The electrically conductive compositions are useful in the manufacture of heating elements such as in dryers, toasters, irons, hot plates, radiant heaters and the like.

Both high and low temperature conductive compositions and films can be produced from the colloidal zinc silicate of this invention depending upon the type of conductive particles incorporated therein.

The low temperature conductive compositions can be prepared by incorporating into the aqueous colloidal silicate prepared in accordance with this invention a sufficient amount of graphite to render the composition conductive upon removal of the water. Aqueous paints prepared in this manner are more stable permitting the paints to be stored for indefinite periods of time without adversely affecting the properties of the dried and set compositions. The conductive paints are also easier to apply uniformly to a suitable surface and will not clog a spray gun. The conductive compositions are also electrically stable during operation by application of a potential and do not vary in resistance. No additional stabilization procedure is necessary.

The conductive compositions to which graphite has been added are advantageously operated at temperatures of about 600° F. and below.

Acheson graphite has been found to be particularly advantageous as an electrically conductive material in making low temperature conductive compositions; however, other electrically conductive materials may be used with the new compositions of this invention. Some examples of suitable electrically conductive materials that may be used are colloidal or semi-colloidal graphite, finely divided graphite powder, graphite flakes, colloidal carbon, and the like. Combinations of electrically conductive materials may also be used.

The proportions of graphite which may be dispersed throughout the new compositions of this invention to form low temperature conductive compositions can vary within fairly wide limits. For example, when graphite is present in amounts of about 60 percent or less based on the total solid content in the mixture, good electrical conductivity and physical properties result. When the graphite percentage is reduced to about 25 percent and below, the conductivity of the composition falls off somewhat. It has been found that the most advantageous range of graphite is about 29 percent to about 51 percent. These limitations, however, are not to be considered critical, for the graphite concentration may fall outside these limits, dependent upon the degree of conductivity desired and the presence of other materials in the mixture in addition to the graphite and the colloidal zinc silicate. It is desirable to have and maintain a surface resistance of between 10 and 100 ohms per square inch in the films and the concentrations of the electrically conductive material can be sufficient to obtain a resistance within that range. The nature of the electrically conductive material chosen will also affect the electrical conductivity of the resulting films and also the proportions of electrically conductive material which will be necessary to achieve the desired electrical conductivity.

An advantage of the low temperature conductive composition of this invention is that they can be impregnated with various resinous materials. The impregnation of the compositions or film increases the strength and adds surface insulation to them without raising the resistance of the films to any significant extent, if at all. The conductive compositions when impregnated with solutions of natural or synthetic resinous materials will, of course, have an operating temperature limited to the operating temperature of the particular resin used to impregnate them. The impregnation of the compositions with various resinous materials in a suitable solvent does not affect the very strong and tough bond between the particles of electrically conductive material nor disrupt the electrical conducting paths established during the initial drying which constitute the electrical circuit. The bonds between the particles making up the composition and with the insulating surface to which the compositions are attached are not infiltrated or weakened by the resin or solvent.

A wide variety of resinous materials may be used for impregnating the compositions. Various natural or synthetic resins commonly used in protective coatings or paints such as phenolic resins, alkyl resins, thermoplastic vinyl resins and the like may be utilized if desired. However, silicone resins have been found to be particularly advantageous. Silicone resins containing alkyl or aryl groups, or both, such as polymethylsiloxane, dimethylsiloxane, diethylsiloxane, methylethylsiloxane, phenylsiloxane, methylphenylsiloxane and the like are some examples. Blends of resins can also be used if desired. The choice of resin depends largely upon the desired flexibility of the film and the operating temperature desired.

The low temperature conductive compositions of this invention may be applied to, or used to impregnate, any desirable electrical insulating surface intended as a support for the conductive films in any conventional manner such as by spraying, brushing, or dipping. Some examples of insulating materials to which the films may be advantageously applied are asbestos board and glass fiber cloth.

The high temperature electrically conductive compositions, films and heating elements are prepared according to this invention by incorporating into the new zinc silicate sols a finely divided zinc, such as zinc dust, and firing the mixture at a sufficient temperature and for a suffiicent time to convert the mixture into a hard, abrasive resistant electrically conductive composition.

The high temperature conductive paints or suspensions are very stable and have a longer shelf life than was heretofore obtainable. The zinc-zinc silicate paints of this invention may be stored for extended periods of time and conductive compositions made therefrom have identical resistances to conductive compositions prepared from fresh paints.

The high temperature conductive compositions and films of this invention also exhibit better physical properties and greater electrical stability than prior compositions, especially when resistances of over 10 ohms per square are desired.

The high temperature conductive compositions also have smaller resistance coefficients than was heretofore possible.

The high temperature electrically conductive compositions and films of this invention have excellent electrical and physical properties and are very abrasive resistant. The compositions when ground-down by an emery wheel, for example, exhibit a smooth metallic sheen. The compositions may be subjected to watt densities as high as 100 to 200 watts per square inch for considerable periods of time without burn-out occurring. The compositions also exhibit a positive temperature coefficient of resistance at high temperatures, for example, at temperatures up to and above 1000° F. I have produced conductive compositions according to this invention which exhibit a positive temperature coefficient of resistance at temperatures of about 1600° F. The high temperature conductive composition can also be subjected to temperatures above the boiling point of metallic zinc without physical degradation of the compositions.

The amount of zinc, such as zinc dust, that may be incorporated into the new alkaline colloidal zinc silicate suspensions to produce electrically conductive compositions may vary within fairly wide limits. The zinc dust utilized should also be fresh. It is essential, however, that there be present a sufficient amount of colloidal zinc silicate to form a continuous film with the zinc upon firing. The amount of zinc is also important because it affects the conductivity of the films. The amount of zinc also plays a part in determining the temperature coefficient of resistance of the compositions. A small proportion of zinc to colloidal zinc silicate is conducive to a higher positive temperature coefficient of resistance.

The particular temperatures used to fire the colloidal zinc silicate-zinc suspensions in order to render the compositions electrically conductive will depend upon a number of variables such as the backing material supporting them during firing, the amount of zinc dust present, and the time of firing. Suspensions having a high zinc silicate content generally require higher temperatures than suspensions having a low colloidal zinc silicate and a high zinc content. It is advantageous to fire the colloidal zinc silicate-zinc suspensions at a temperature of about 1000° F. At about this temperature the time of firing necessary to render them conductive is only a few minutes.

Self-supporting high temperature electrically conductive compositions can be produced according to this invention by applying the compositions to backing members having a parting agent between the backing members and the applied compositions. The compositions, together with backing members, may then be fired according to the present invention, and the conductive compositions then stripped from the backing members. An example of a suitable parting agent is graphite. Unsupported compositions may also be produced by coating the compositions on heavy paper, such as cardboard, and then firing the compositions together with the paper. The paper is burned off during the firing operation, leaving the self-supporting electrically conductive compositions.

In making a composite heating element, the compositions before firing may be applied to the backing member by various suitable means, such as by brushing, spraying, or dipping, to the thickness desired. I have found that a film thickness of between about 2 to 10 mils is advantageous. The applied films, together with the backing members, are then fired to render the films electrically conductive. The firing of the compositions applied to a backing member as a film together with the backing member also strongly adheres the films to the backing member.

The new high temperature conductive compositions of the present invention may be fired between pieces of insulating materials such as ceramics or refractory materials. The compositions may be applied to an insulating material as a film and fired, electrodes applied to the film, and another ceramic or refractory material fired onto the conductive film. The subsequent firing of the refractory material, such as an enamel frit in water, on top of the conductive film does not adversely affect the physical or electrical properties of the film. The electrically conductive compositions when sandwiched between fired layers of insulating materials such as enamel or ceramic have the advantage of being inert, durable, heat resistant, attractive, and easy to clean. The cover layers also provide electrical, mechanical, and chemical protection for the conductive films.

Electrodes can also be fired directly on the high temperature conductive films or compositions of the present invention for application of the electrical contacts. It is advantageous to connect the electrical contacts by means of suitable electrodes, covering a suitable area of the conductive compositions, to more evenly distribute the current over the entire area of the composition or film and avoid hot spots at the points of contact. Different types of electrodes may be applied as desired; however, I have found that silver-glass frit electrodes are advantageous, and particularly so if the heating elements are to be used at high temperatures. Silver-glass frit electrodes may be fired directly on the compositions and films of the present invention, and will not penetrate the compositions or films nor disrupt their electrical properties in any manner. Zinc or aluminum powder may also be used as electrodes and may be utilized to form heating elements for lower temperature operation. The electrical contacts may be connected to the electrodes by any suitable means which will withstand the operating temperatures contemplated for the heating elements. For high temperature operation, I have found that a mechanical connection such as a stainless steel screw and bolt connection, is advantageous. Nicrom connections may also be used for high temperature operation.

The size and shape of the backing members to which the high or low temperature conductive compositions of this invention can be applied will vary depending upon the type of heating element, such as a hot plate, in which it is desired to use the supported conductive compositions. The compositions of the present invention may be applied to insulating articles of various sizes and shapes, such as rods, bars, sheets, tubes and the like.

The high temperature conductive compositions of this invention may also be applied to different compatible insulating bases or backing materials. A porous base is advantageous in that the composition may be applied and fired thereon more easily than on a smooth surfaced base, but a smooth surface may, however, be used. The particular base to which the compositions are to be applied should not be adversely affected by the firing of the compositions to render them conductive, nor in the subsequent use of the composite heating elements. Nor should the base adversely affect the desired electrical or physical properties of the conductive films or compositions. The insulating base chosen should have a coefficient of expansion similar to that of the electrically conductive compositions. The coefficient of expansion of the compositions of the present invention will of course vary depending upon the particular components and the amounts thereof utilized to form the compositions. For example, compositions of the present invention having a coefficient of expansion of roughly $3-4 \times 10^{-6}$ per degree centigrade may readily be applied to and used with a backing member having a coefficient of expansion of $1 \times 10^{-6}$ or $10 \times 10^{-6}$. The backing members should also have sufficient thermal shock resistance to withstand the operating conditions of the heating elements made in accordance with the present invention. A backing member which is an excellent insulator having a high resistance is advantageous. The backing member should also maintain a fairly high resistance throughout the temperature range calculated for operation of the heating element. It is also advantageous to employ a backing member having a softening point higher than the temperature at which the compositions of the present invention are to be fired.

Various insulating materials having the necessary and advantageous compatibilities as discussed above, such as enamels, ceramics, quartz, magnesium aluminum silicates, and the like may be used as base members for the conductive compositions of the present invention.

The invention also includes the method of stabilizing the new conductive compositions and films of this invention towards cycling. As hereinbefore pointed out, the silica-zinc mixtures are rendered conductive by firing at temperatures of about 1000° F. for a few minutes. The conductive compositions however, tend to increase in resistance during cycling.

I have found that the conductive compositions and films of this invention can be rendered stable towards cycling by a heat stabilization treatment. The time and temperature of heating will be mainly determined by the degree of stability desired. I have found that if the conductive compositions are heat treated at a temperature of about 1100° F. for 10 to 12 hours that the compositions exhibit good stability towards cycling.

I have also found that the stability towards cycling of the conductive compositions can be further improved and rendered completely stable by applying a colloidal silica slurry such as a 30% solids "Ludox" composition to the conductive films after they have been heat stabilized towards cycling. After the silica coating has been applied it is dried in air. After the silica coating has been dried, it can then be fired again for a few minutes at about 1000° F. if desired.

The cycle stability of the conductive compositions can also be advantageously improved by submerging or soaking the composition in a "Ludox" slurry for a few minutes before it is fired to render it conductive as set forth in the examples. It is also advantageous to follow this treatment with the heat stabilization treatment.

*Example 1.*—100 parts by weight of Ludox colloidal silica comprising a water slurry containing about 30% solids and between about 29 to 31% by weight $SiO_2$, 0.29 to 0.31% by weight $Na_2O$ and a maximum of 0.15% by weight $Na_2SO_4$ were placed in a suitable container. 100 parts by weight of zinc dust was gradually added to the silica slurry over a period of about 2 hours with continuous agitation. At the end of this period the bottom of the container contained large floc type particles resembling cheese and the remainder of the product in the container was a fairly dark suspension of colloidal zinc silicate. The colloidal zinc silicate was separated from the floc type particles by decantation.

*Example 2.*—To 15 parts by weight of the aqueous colloidal zinc silicate as produced in Example 1, 20 parts by weight of powdered Acheson graphite were added and thoroughly dispersed therein. The composition was then sprayed on an asbestos board and air dried. The resulting film had excellent stability at 14 watts per square inch. The film was porous and tightly adhered to the asbestos. Upon impregnation of the film with a silicone resin, the film took on the properties of the resins and exhibited good strength and flexibility.

*Example 3.*—To 44 parts by weight of the aqueous colloidal zinc silicate as produced in Example 1, 44 parts by weight of fine graphite powder was added and thoroughly mixed therein. The mixture was sprayed on heat cleaned glass cloth and air dried. Electrodes were painted on the dried composition and a potential of 14 watts per square inch applied through electrical contacts. The composition was stable after an extended on-time without change in resistance. The film was porous and when impregnated with a silicone resin exhibited increased strength and flexibility and identical electrical properties as the unimpregnated film.

*Example 4.*—To 15 parts by weight of the alkaline aqueous colloidal zinc silicate as produced in Example 1, 20 parts by weight of fresh zinc dust was added and thoroughly dispersed therein. The suspension was then applied by spraying on an insulating refractory base material and allowed to dry to remove at least most of the water. The dried film was not electrically conductive and had little physical strength. The dried film together with the base was placed in a furnace and heated in air to a temperature of about 1100° F. for a period of about 30 minutes and then removed from the furnace and cooled. Silver-glass frit electrodes were then fired on two outer edges of the conductive film at about 1200° F. The electrodes were connected to a source of potential of 35 watts per square inch. At this wattage the film glowed uniformly, and after an extended on-time the film showed no change in resistance and there was no evidence of either physical or electrical failure. The film also exhibited a positive temperature coefficient of resistance at temperatures above 1000° F. The film and backing were then further heated at a temperature of 1100° F. for 2 hours and painted with a Ludox slurry. The resulting heat stabilized conductive film was completely stable towards cycling.

*Example 5.*—To 10 parts by weight of the colloidal zinc silicate as produced in Example 1, 20 parts by weight of fresh zinc dust were added. The mixture was applied to an extruded cylindrical bar composed of magnesium aluminum silicate and then dried. The coated bar was then placed in a furnace and heated at about 1450° F. for about 10 minutes, removed from the furnace and cooled. Silver-glass frit electrodes were then fired on the bar at the ends at 1200° F. Stainless steel electrical contacts were then attached to the electrodes. After running the heating element at 35 watts per square inch for a considerable length of time, there was no measurable change in resistance. The film also exhibited a positive temperature coefficient of resistance and when ground down exhibited a smooth abrasive resistant metallic sheen.

I claim:

1. The method of making new colloidal zinc silicate compositions which comprises mixing a finely divided colloidal silica dispersion containing between about 0.29 to 1.0 percent by weight alkali expressed as $Na_2O$ based on the weight of silica originally present together with finely divided zinc in an aqueous medium and agitating the mixture in the presence of air for a sufficient length of time to form colloidal zinc silicate.

2. The method of claim 1 in which the alkali content of the mixture is about 1 percent by weight expressed as $Na_2O$ based on the weight of silica originally present.

3. Colloidal zinc silicate produced in accordance with the method of claim 1.

4. The method of making new colloidal zinc silicate which comprises slowly adding a finely divided zinc to an aqueous colloidal silica dispersion containing between about 0.29 to 1.0 percent by weight of alkali expressed as $Na_2O$ based on the weight of silica originally present over an extended period of time and agitating the aqueous silica dispersion during the addition of the zinc in the presence of air.

5. A new composition of matter capable of being transformed into an electrically conductive composition consisting essentially of finely divided electrically conductive particles dispersed throughout an alkaline aqueous colloidal zinc silicate formed by agitating in air a mixture of finely divided zinc with an aqueous colloidal silica dispersion containing between about 0.29 to 1.0 percent by weight of alkali expressed as $Na_2O$ based on the weight of silica originally present for a sufficient time to form colloidal zinc silicate, said conductive particles being present in said composition in an amount sufficient to render the composition electrically conductive when dry.

6. The composition of claim 5 in which the conductive particles are graphite particles.

7. The composition of claim 5 in which the conductive particles are zinc particles.

8. The method of making an electrically conductive composition, film, and heating element which comprises forming a mixture consisting essentially of a finely divided colloidal silica dispersion containing between about 0.29 to 1.0 percent by weight of alkali expressed as $Na_2O$ based on the weight of silica originally present together with finely divided zinc in an aqueous medium, agitating the mixture in air for a sufficient length of time to form a colloidal zinc silicate reaction product, separating the reaction product from the reaction mixture, mixing finely divided graphite with the colloidal zinc silicate reaction product in an amount sufficient to render the composition electrically conductive when dry, applying the graphite-zinc silicate dispersion to an insulating base, and then drying the applied dispersion.

9. An electrically conductive element produced in accordance with the method of claim 8.

10. The method of making an electrically conductive composition, film, and heating element which comprises forming a mixture consisting essentially of a finely divided colloidal silica dispersion containing between about 0.29 to 1.0 percent by weight of alkali expressed as $Na_2O$ based on the weight of silica originally present together with finely divided zinc in an aqueous medium, agitating the mixture in air for a sufficient length of time to form a colloidal zinc silicate reaction product, separating the reaction product from the reaction mixture, mixing finely divided zinc with the colloidal zinc silicate reaction product in an amount sufficient to render the composition electrically conductive when heated, applying the zinc-zinc silicate dispersion to an insulating base, and heating the mixture for a sufficient length of time to form a hard abrasive resistant electrically conductive composition.

11. An electrically conductive element produced in accordance with the method of claim 10.

References Cited in the file of this patent

UNITED STATES PATENTS

| | | |
|---|---|---|
| 1,232,843 | Rice | July 10, 1917 |
| 1,422,130 | Reynolds | July 11, 1922 |
| 2,361,220 | Loftis | Oct. 24, 1944 |
| 2,522,750 | Deschamps | Sept. 19, 1950 |
| 2,657,183 | Bechtold | Oct. 27, 1953 |
| 2,668,149 | Iler | Feb. 2, 1954 |